(12) United States Patent
Feger et al.

(10) Patent No.: US 7,445,249 B2
(45) Date of Patent: Nov. 4, 2008

(54) COUPLING

(75) Inventors: Axel Feger, Lorrach (DE); Michael Trede, Hamsheim (FR)

(73) Assignee: A. Raymond & CIE, Grenoble (FR)

( * ) Notice: Subject to any disclaimer, the term of this patent is extended or adjusted under 35 U.S.C. 154(b) by 102 days.

(21) Appl. No.: 11/573,483

(22) PCT Filed: Nov. 25, 2004

(86) PCT No.: PCT/EP2004/013368

§ 371 (c)(1),
(2), (4) Date: Feb. 9, 2007

(87) PCT Pub. No.: WO2006/018038

PCT Pub. Date: Feb. 23, 2006

(65) Prior Publication Data

US 2007/0246937 A1    Oct. 25, 2007

(51) Int. Cl.
*F16L 37/00* (2006.01)
(52) U.S. Cl. .......................... 285/305; 285/93
(58) Field of Classification Search .......... 285/305, 285/93, 308
See application file for complete search history.

(56) References Cited

U.S. PATENT DOCUMENTS 2,021,241 A    11/1935    Mall
5,897,145 A *  4/1999    Kondo et al. .................. 285/93
6,540,263 B1   4/2003    Sausner
6,554,322 B2 * 4/2003    Duong et al. ............... 285/305
6,846,021 B2 * 1/2005    Rohde et al. ................ 285/305
6,983,958 B2 * 1/2006    Rautureau .................. 285/305
7,390,025 B2 * 6/2008    Pepe et al. ..................... 285/93

FOREIGN PATENT DOCUMENTS

DE          19946260 C1     1/2001
WO          WO98/28567      7/1998

OTHER PUBLICATIONS

Official WIPO Translation of the International Preliminary Report on Patentability.

* cited by examiner

*Primary Examiner*—David E Bochna
(74) *Attorney, Agent, or Firm*—Baker & Daniels LLP

(57) ABSTRACT

The invention relates to a coupling comprising a receiving part (1) and a fixing part (10), which have a blocking assembly (15, 16, 17). If the insertion part has not been introduced into the receiving part (1) correctly, elements (15, 16, 17) of the blocking assembly that are configured on the receiving part (1) and on the fixing part (10) engage with one another in such a way that the fixing part (10) is prevented from being retracted from the extended position. Arms (11, 12) of the fixing part (10) are configured in such a way that when a retaining ring of the insertion part is positioned in the vicinity of said arms (11, 12), the engagement of the elements (15, 16, 17) of the blocking assembly is released and the fixing part (10) can be displaced into the retracted position to engage behind the retaining ring by means of the retraction section. This permits an efficient mounting operation.

2 Claims, 4 Drawing Sheets

COUPLING

BACKGROUND OF THE INVENTION

The present invention relates to a coupling.

One known coupling is from DE 199 46 260 C1. The previously known coupling is provided with a receiving element for receiving a plug-in part configured with a retaining ring. Also present is a securing element provided with two arms and a retaining section, the securing element being insertable into a receiving space of the receiving element and movable perpendicularly to an insertion direction of said plug-in part between an extended position and a pushed-in position. When the securing element is in the pushed-in position, the plug-in part is thereby secured against accidentally slipping out of the receiving element by the engagement of the retaining section behind the retaining ring. It is possible, however, for the securing element to be in the pushed-in position without the plug-in part being properly secured.

SUMMARY OF THE INVENTION

The present invention provides a coupling that is characterized by high reliability of assembly.

In the inventive coupling, a blocking arrangement is present that allows the securing element to be moved unhindered from the extended position to the pushed-in position, with the retaining section thereby engaging behind the retaining ring, only when the action of the blocking arrangement is cancelled by fact of the retaining ring being disposed in the vicinity of the arms, making it possible to verify proper assembly, which is very important particularly in assembly-line work involving the fast-paced interconnection of couplings according to the invention with plug-in parts.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
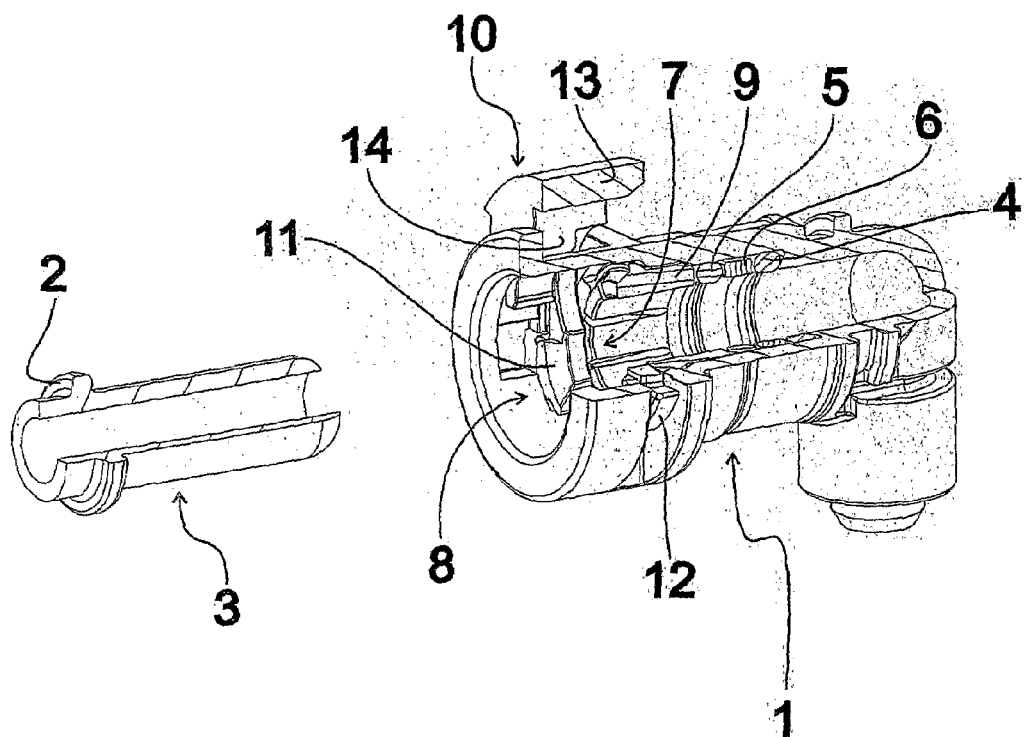
FIG. 1 is a partially cut away perspective view of an exemplary embodiment of an inventive coupling comprising a receiving element and a securing element, together with a plug-in part to be inserted in the inventive coupling.

Corresponding reference characters indicate corresponding parts throughout the several views. Although the exemplifications set out herein illustrate embodiments of the invention, in several forms, the embodiments disclosed below are not intended to be exhaustive or to be construed as limiting the scope of the invention to the precise forms disclosed.

DETAILED DESCRIPTION

FIG. 1 is a partially cut away perspective view of an exemplary embodiment of a coupling according to the invention. The coupling according to FIG. 1 is provided with a receiving element 1, which is connectable by an end not shown in FIG. 1 to a line of a fluid conducting system. To sealingly connect the inventive coupling to a plug-in part 3 configured with a retaining ring 2, disposed in a receiving space 7 of receiving element 1 are a first sealing ring 4, a second sealing ring 5 and an intermediate ring 6 located between sealing rings 4, 5. A spacing ring 9 disposed adjacent the side of second sealing ring 5 facing toward an insertion side 8 serves to hold sealing rings 4, 5 and intermediate ring 6 between the side of receiving space 7 facing away from insertion side 8 and a securing element 10 of the inventive coupling.

Securing element 10 is displaceable in receiving element 1 between an extended position, illustrated in FIG. 1, and a pushed-in position, and is provided with a first arm 11 and a second arm 12, which are disposed opposite each other and protrude by an inner section into receiving space 7. In addition, configured on a transverse section 13 extending between arms 11, 12 is a retaining section 14, which, as explained in greater detail below, if plug-in part 3 is correctly inserted, engages behind retaining ring 2 when securing element 10 is in a fully pushed-in position.

Figure 2:
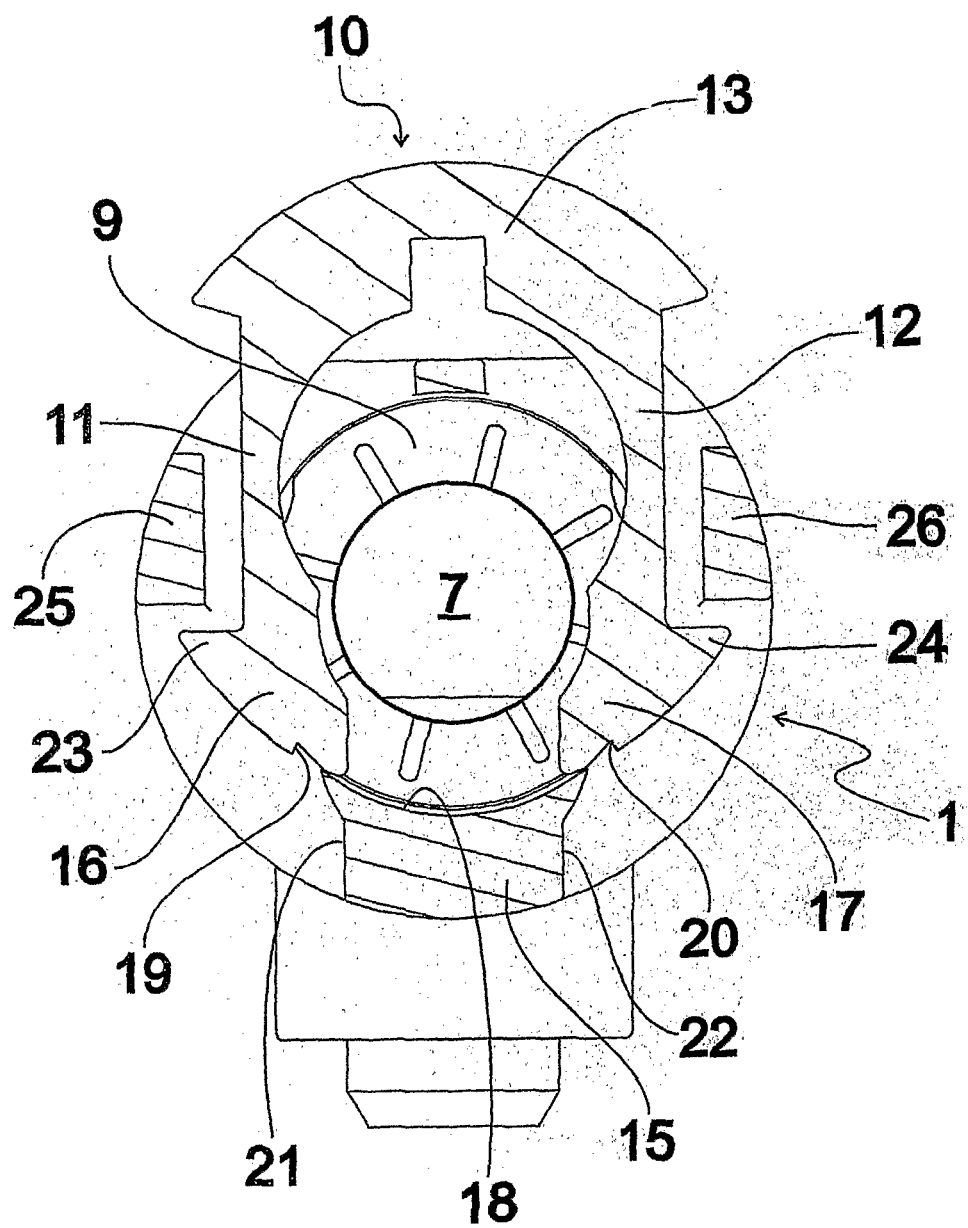
FIG. 2 is a cross section of the exemplary embodiment according to FIG. 1 in the region of arms of the securing element.

FIG. 2 shows the exemplary embodiment according to FIG. 1 in cross section in the region of arms 11, 12 with securing element 10 in the extended position. It can be seen from FIG. 2 that receiving element 1 is provided with a base bridge 15 as one element of a blocking arrangement disposed in the vicinity of arms 11, 12 of securing element 10, opposite transverse section 13. The width of base bridge 15 is greater than the distance between free ends 16, 17 of arms 11, 12, when, as illustrated in FIG. 2, securing element 10, particularly in delivery condition, is in the extended position and plug-in part 3 is not inserted, or is not inserted so far that retaining ring 2 is disposed between arms 11, 12. Consequently, the free ends 16, 17 of arms 11, 12, as further elements of the blocking arrangement, abut an inner wall 18 of base bridge 15 that faces toward receiving space 7 and prevent securing element 10 from being moved into the fully pushed-in position.

It can be seen from FIG. 2 that a blocking offset 19, 20 of a blocking arrangement is configured at each free end 16, 17, at a distance from the outermost end of that free end 16, 17. To prevent overloading of arms 11, 12, this ensures that when a force acting in the direction of base bridge 15 is exerted on transverse section 13, securing element 10 plunges in for the distance of an inward stroke that is predetermined by the radial and axial arrangement of blocking offsets 19, 20, until blocking offsets 19, 20 come to rest against edges formed between the inner wall 18 and the side walls 21, 22 of base bridge 15 and prevent any further movement of securing element 10 in the direction of the fully pushed-in position.

It can further be discerned from FIG. 2 that formed on the outer side of each of arms 11, 12 is a radially outwardly projecting securing nose 23, 24, each of which, to protect securing element 10 against accidentally being withdrawn from receiving element 1, cooperates with a respective lateral bridge 25, 26 disposed laterally to the respective arm 11, 12 and extending in the longitudinal direction of receiving element 1, by striking against the respective lateral bridge 25, 26 without exerting a radially inwardly acting force on arms 11, 12 that would bring them close enough together for securing element 10 to be removed.

Figure 3:
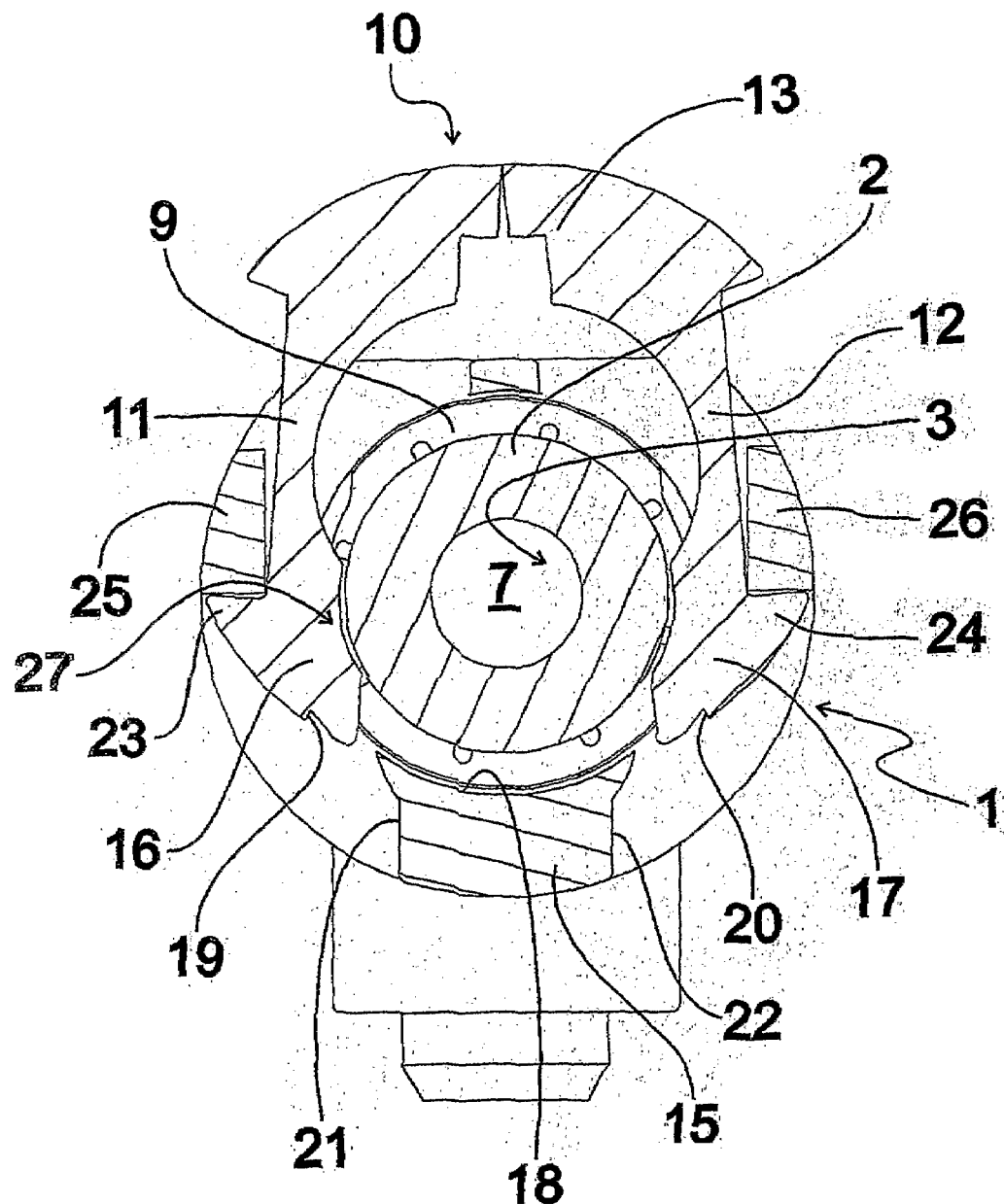
FIG. 3 is a cross section of the exemplary embodiment according to FIG. 1 in the region of the arms of the securing element, with a plug-in part inserted and the securing element in an extended position.

FIG. 3 shows the exemplary embodiment according to FIG. 1 in a representation corresponding to FIG. 2, with a plug-in part 3 inserted so far into receiving element 1 that retaining ring 2 is disposed between arms 11, 12, it being expedient in this context for the sides of arms 11, 12 oriented toward insertion side 8 to be provided with sliding bevels to facilitate the insertion of plug-in part 3 into the position depicted in FIG. 3. It can be seen from FIG. 3 that only in this arrangement of plug-in part 3 are the free ends 16, 17 of arms 11, 12, which are configured with a first receiving region 27 adapted to the outer diameter of retaining ring 3, spaced so far apart that the engagement between the elements of the blocking arrangement is released, i.e. in the depicted exemplary embodiment base bridge 15 and the free ends 16, 17 of arms 11, 12.

Figure 4:
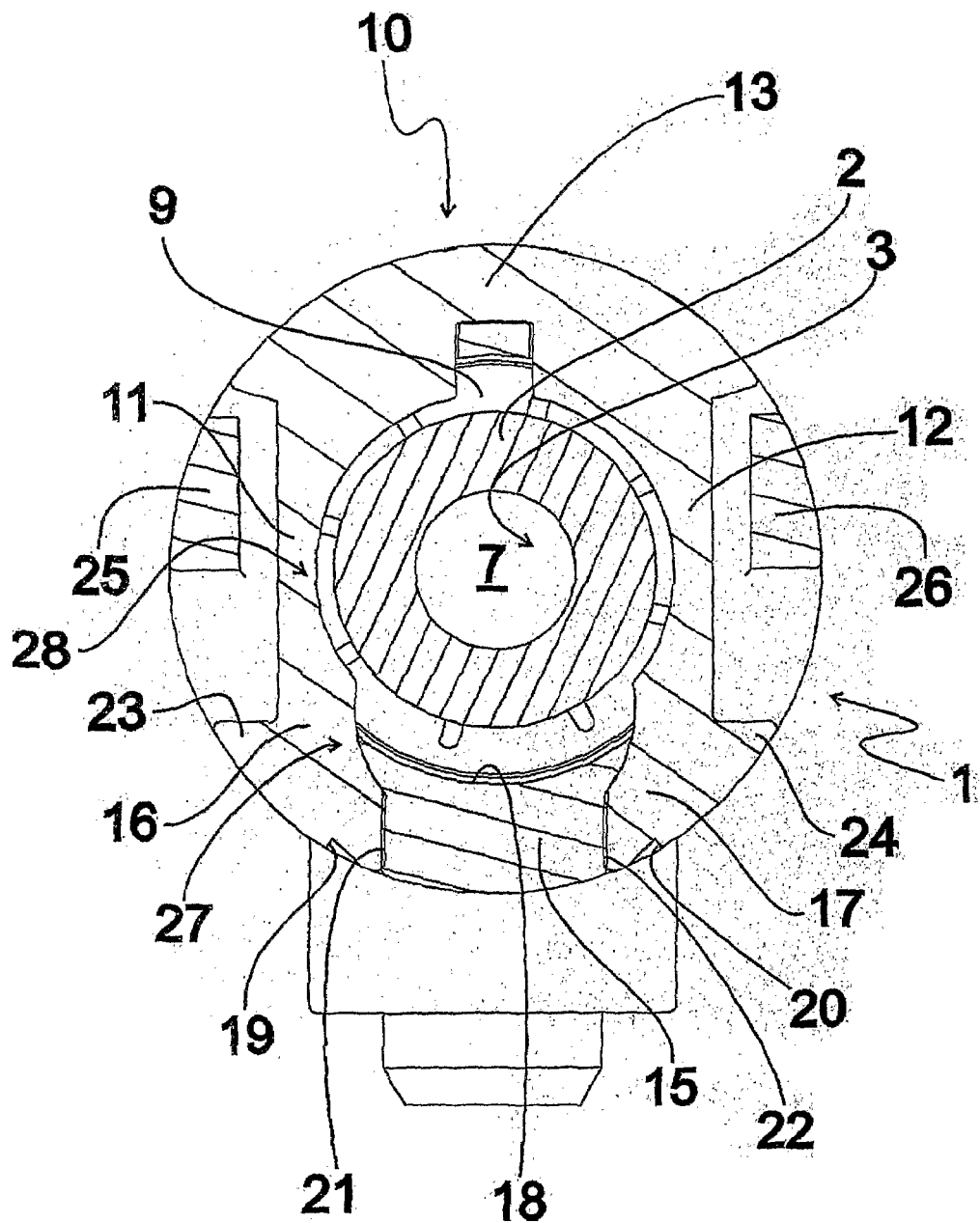
FIG. 4 is a cross section of the exemplary embodiment according to FIG. 1 in the region of the arms of the securing element, with a plug-in part inserted and the securing element in a pushed-in position.

FIG. 4 shows the exemplary embodiment according to FIG. 1 with the inserted plug-in part 3 in the arrangement according to FIG. 3, securing element 10 now being in a fully pushed-in position. In the fully pushed-in position of securing element 10 illustrated in FIG. 4, retaining section 14, which is not visible in the representation of FIG. 4, engages behind retaining ring 2 and thereby secures plug-in part 3 against accidentally being withdrawn from receiving element 1. It can further be appreciated from FIG. 4 that the side walls 21, 22 of base bridge 15, which are shown in section, and the inner sides of arms 11, 12 facing these sections of side walls 21, 22 have mutually adapted outer contours, so that in a second receiving region 28 formed at free ends 16, 17, and having a larger inner diameter than the circumference of retaining ring 2, retaining ring 2 has the latitude of with a certain distance from free arms 11, 12.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A coupling, comprising:
a plug-in part configured with a retaining ring; and
a receiving element for receiving said plug-in part, including a securing element having two arms and a retaining section, said securing element insertable into a receiving space of said receiving element and movable substantially perpendicularly to an insertion direction of said plug-in part between an extended position and a pushed-in position;
said receiving element and said securing element including a blocking arrangement wherein, if said plug-in part is not correctly inserted in said receiving part, elements of said blocking arrangement that are configured on said receiving element and on said securing element engage with one another to prevent said securing element from being moved from said extended position to said pushed-in position,
wherein an element of said blocking arrangement that is configured on said receiving element is a bridge section bounding said receiving space and extending transversely to the insertion direction;
said blocking arrangement further including free ends of said arms of said securing element, and said bridge section having a width that is greater than the distance between said arms in the extended position of said securing element, wherein when said retaining ring is disposed in the vicinity of said arms, said arms are spaced from one another such that the engagement between the bridge section and said free ends of said arms is released and said securing element can be moved into the pushed-in position, said retaining section engaging behind said retaining ring.

2. The coupling of claim 1, wherein said arms further comprise a blocking arrangement which, when said securing element is acted upon to move it from the extended position to the pushed-in position, cooperates with said blocking arrangement to block movement of said securing element beyond a predetermined inward stroke.

* * * * *